United States Patent
Li et al.

(10) Patent No.: US 10,769,480 B2
(45) Date of Patent: Sep. 8, 2020

(54) OBJECT DETECTION METHOD AND SYSTEM

(71) Applicant: SAMSUNG ELECTRONICS CO., LTD., Suwon-si, Gyeonggi-do (KR)

(72) Inventors: Jia Li, Beijing (CN); Feng Shi, Beijing (CN); Weiheng Liu, Beijing (KR); Dongqing Zou, Beijing (CN); Qiang Wang, Beijing (CN); Hyunsurk Ryu, Hwaseong-si (CN); Keun Joo Park, Seoul (KR); Hyunku Lee, Suwon-si (KR)

(73) Assignees: SAMSUNG ELECTRONICS CO., LTD., Suwon-si, Gyeonggi-Do (KR); BEIJING SAMSUNG TELECOM R&D CENTER, Beijing (CN)

( * ) Notice: Subject to any disclaimer, the term of this patent is extended or adjusted under 35 U.S.C. 154(b) by 0 days.

(21) Appl. No.: 16/113,409

(22) Filed: Aug. 27, 2018

(65) Prior Publication Data

US 2019/0065885 A1 Feb. 28, 2019

(30) Foreign Application Priority Data

Aug. 29, 2017 (CN) .......................... 2017 1 0756068

(51) Int. Cl.
| | |
|---|---|
| *G06K 9/46* | (2006.01) |
| *G06T 7/246* | (2017.01) |
| *H04N 7/18* | (2006.01) |
| *G06K 9/00* | (2006.01) |
| *G06T 7/73* | (2017.01) |

(52) U.S. Cl.
CPC ........... *G06K 9/46* (2013.01); *G06K 9/00624* (2013.01); *G06K 9/00744* (2013.01); *G06T 7/248* (2017.01); *G06T 7/73* (2017.01); *H04N 7/188* (2013.01); *G06T 2207/10016* (2013.01); *G06T 2207/20084* (2013.01); *H04N 7/183* (2013.01)

(58) Field of Classification Search
USPC ........................................................ 348/143
See application file for complete search history.

(56) References Cited

U.S. PATENT DOCUMENTS

| | | | |
|---|---|---|---|
| 8,824,830 B2 | 9/2014 | Le Meur et al. | |
| 9,275,308 B2 | 3/2016 | Szegedy et al. | |
| 9,424,493 B2 | 8/2016 | He et al. | |
| (Continued) | | | |

FOREIGN PATENT DOCUMENTS

CN 106203450 12/2016

*Primary Examiner* — Christopher S Kelley
*Assistant Examiner* — Ana Picon-Feliciano
(74) *Attorney, Agent, or Firm* — F. Chau & Associates, LLC

(57) ABSTRACT

An object detection method and a neural network system for object detection are disclosed. The object detection method acquires a current frame of a sequence of frames representing an image sequence, and extracts a feature map of the current frame. The extracted feature map is pooled with information of a pooled feature map of a previous frame to thereby obtain a pooled feature map of the current frame. An object is detected from the pooled feature map of the current frame. A dynamic vision sensor (DVS) may be utilized to provide the sequence of frames. Improved object detection accuracy may be realized, particularly when object movement speed is slow.

17 Claims, 5 Drawing Sheets

(56) References Cited

U.S. PATENT DOCUMENTS

| | | |
|---|---|---|
| 2015/0254532 A1 | 9/2015 | Talathi et al. |
| 2016/0035078 A1 | 2/2016 | Lin et al. |
| 2016/0063991 A1 | 3/2016 | Chopra et al. |
| 2016/0070673 A1 | 3/2016 | Wang et al. |
| 2016/0217198 A1* | 7/2016 | Lee ..................... G06N 3/0454 |
| 2016/0259994 A1 | 9/2016 | Ravindran et al. |
| 2017/0083798 A1 | 3/2017 | Yu et al. |
| 2017/0109582 A1 | 4/2017 | Kuznetsova et al. |
| 2017/0132468 A1 | 5/2017 | Mosher et al. |
| 2017/0228634 A1* | 8/2017 | Tomita ................ G06N 3/0454 |
| 2018/0129742 A1* | 5/2018 | Li ..................... G06K 9/00771 |

* cited by examiner

OBJECT DETECTION METHOD AND SYSTEM

CROSS REFERENCE TO RELATED APPLICATION(S)

This application claims priority under 35 U.S.C. § 119 to State Intellectual Property Office (SIPO) of the People's Republic of China, Application No. 201710756068.6, filed on Aug. 29, 2017 in SIPO of the People's Republic of China, the content of which is incorporated herein by reference in its entirety.

BACKGROUND

1. Technical Field

The present disclosure relates generally to object detection and more particularly to an object detection method and a neural network system for object detection.

2. Discussion of the Related Art

In computer vision, object detection involves identifying and detecting an object of interest in an image or a video. Object detection plays an important role in fields such as robotics, autonomous vehicles, drones, surveillance and gesture-based interaction systems. Hence, research in object detection has gained considerable attention in recent years.

General object detection methods mainly detect objects using geometric transformation between keypoint locations, and traversing an entire frame image through a sliding window by using image descriptors. Example techniques such as HOG (Histogram of Oriented Gradients), SIFT (Scale Invariant Feature Transformation), LBP (Local Binary Patterns) and the like search for a maximum response area, thus detecting features of an object and the object itself.

In addition, with the advent of deep learning, an object detection method based on a deep neural network has developed, and this method has gained attention due to its high efficiency.

The above methods perform an object detection operation based on a single frame image and thereby achieve accurate object detection based on a single image. However, precise detection for objects within video has proved difficult to achieve.

In recent years, dynamic vision sensor (DVS) cameras have gained wide attention as they can encode a visual dynamic signal into an asynchronous microsecond precision event flow and then generate frame images through the event flow to track an object that is rapidly moving. An object that is moving fast can be accurately detected by detecting the object using frame images captured through a DVS camera in conjunction with the above-mentioned image descriptor methods. However, the ability to detect slower moving objects accurately with this technology has been difficult to achieve.

SUMMARY

Illustrative embodiments of the present disclosure provide an object detection method and system which overcome the drawback of inaccurate detection of slow moving objects by current object detection methods. Further, an object detection method and a neural network system for object detection of the present disclosure may obtain accurate detection results with less calculations, thereby improving processing efficiency in object detection.

According to an exemplary embodiment of the present disclosure, an object detection method is provided, in which at least one processor executes operations including: (A) acquiring a current frame of a sequence of frames representing an image sequence; (B) extracting a feature map of the current frame; (C) pooling the feature map of the current frame with information of a pooled feature map of a previous frame to thereby obtain a pooled feature map of the current frame; and (D) detecting an object from the pooled feature map of the current frame.

In various exemplary embodiments:

Operation (C) may include: (C1) obtaining a weight image of the current frame using the pooled feature map of the previous frame and the feature map of the current frame; and (C2) obtaining the pooled feature map of the current frame using the pooled feature map of the previous frame, the feature map of the current frame and the weight image of the current frame.

When the current frame image is a $t^{th}$ frame image, where t is an integer larger than 1, respective weight values in the weight image of the current frame may be calculated through the following equation: $\omega_{t,i} = N_{mlp}(f_{t-1,i}, x_{t,i})$, where $\omega_{t,i}$ is a weight value of a coordinate "i" in a weight image of a $t^{th}$ frame, and a value range of $\omega_{t,i}$ is [0, 1]. $N_{mlp}$ is a multilayer perceptron neural network, and $f_{t-1,i}$ and $x_{t,i}$ are inputs to the multilayer perceptron neural network, where $f_{t-1,i}$ indicates a pooled feature value of the coordinate i in a pooled feature map of a $(t-1)^{th}$ frame, $x_{t,i}$ is a feature value of the coordinate i in a feature map of the $t^{th}$ frame, and i represents a two-dimensional coordinate of an image element.

Respective pooled feature values in a pooled feature map of the $t^{th}$ frame may be calculated through the following equation: $f_{t,i} = \rho[s(f_{t-1,i}, \omega_{t,i}), x_{t,i}]$, where $f_{t,i}$ indicates a pooled feature value of the coordinate i in the pooled feature map of the $t^{th}$ frame, a function s is used for multiplying $f_{t-1,i}$ and $\omega_{t,i}$, a function $\rho$ is a pooled function and is used for determining a maximum value among a range of values calculated through the function s and $x_{t,i}$ or is used for calculating an average value of the value calculated through the function s and $x_{t,i}$.

The pooled feature map of the current frame may be obtained by recursive application of a plurality of pooled feature maps of respective previous frames.

The sequence of frames may be obtained though image capture by a dynamic vision sensor camera.

Operation (B) may include obtaining the feature map of the current frame by performing a convolution operation on the current frame image repetitiously a predetermined number of times.

According to another exemplary embodiment of the present disclosure, a system for object detection is provided, which includes: a feature extraction subnetwork configured to acquire a current frame of a sequence of frames representing an image sequence and extract a feature map of the current frame; a time domain pooling subnetwork configured to pool the feature map of the current frame with information of a pooled feature map of a previous frame to thereby obtain a pooled feature map of the current frame; and a detection subnetwork configured to detect an object from the pooled feature map of the current frame.

The system may be a neural network system.

In another exemplary embodiment, an electronic apparatus includes an event camera and an object detection system including at least one processor executing instructions to: (i)

acquire from the event camera a current frame of a sequence of frames representing an image sequence; (ii) extract a feature map of the current frame; and (iii) pool the feature map of the current frame with information of a pooled feature map of a previous frame to thereby obtain a pooled feature map of the current frame. The pooled feature map of the previous frame is generated through recursive application of a plurality of pooled feature maps of respective prior frames. The processor further detects an object from the pooled feature map of the current frame.

In the electronic apparatus, the object detection system may be a neural network system. The electronic apparatus may further include at least one of a long and short term memory network (LSTM) and a sequence non-maximum suppression network (Seq-NMS).

According to the object detection method, the system for object detection and the electronic apparatus of the present disclosure, an object can be more accurately detected by combining information of the feature map of the current frame image and information of pooled feature maps of respective frames prior to the current frame image.

BRIEF DESCRIPTION OF THE DRAWINGS

The above and other objects, features of exemplary embodiments of the present disclosure will become apparent from the following description, taken in conjunction with the accompanying drawings in which like reference characters denote like elements or operations, wherein.

DETAILED DESCRIPTION

Hereinafter, exemplary embodiments of the present disclosure will be described with reference to the drawings to illustrate the inventive concept. The description includes various specific details to assist a person of ordinary skill the art with understanding the inventive concept, but these details are to be regarded as merely illustrative. For the purposes of simplicity and clarity, descriptions of well-known functions and constructions may be omitted when their inclusion may obscure appreciation of the inventive concept by a person of ordinary skill in the art.

In the following description, an image sequence may refer to a sequence of periodic still images representing a real world scene captured by a camera over time. The term "frame" refers to a single still image of the sequence of still images. Herein, the terms "frame" and "frame image" are synonymous and may be used interchangeably.

Herein, the terms "feature map" and "independent feature map" may be used interchangeably to signify a map of object features in a single frame that does not include feature map information of any previous frame. The term "pooled feature map" refers to a map of features derived from two or more frames that differ temporally.

Figure 1:
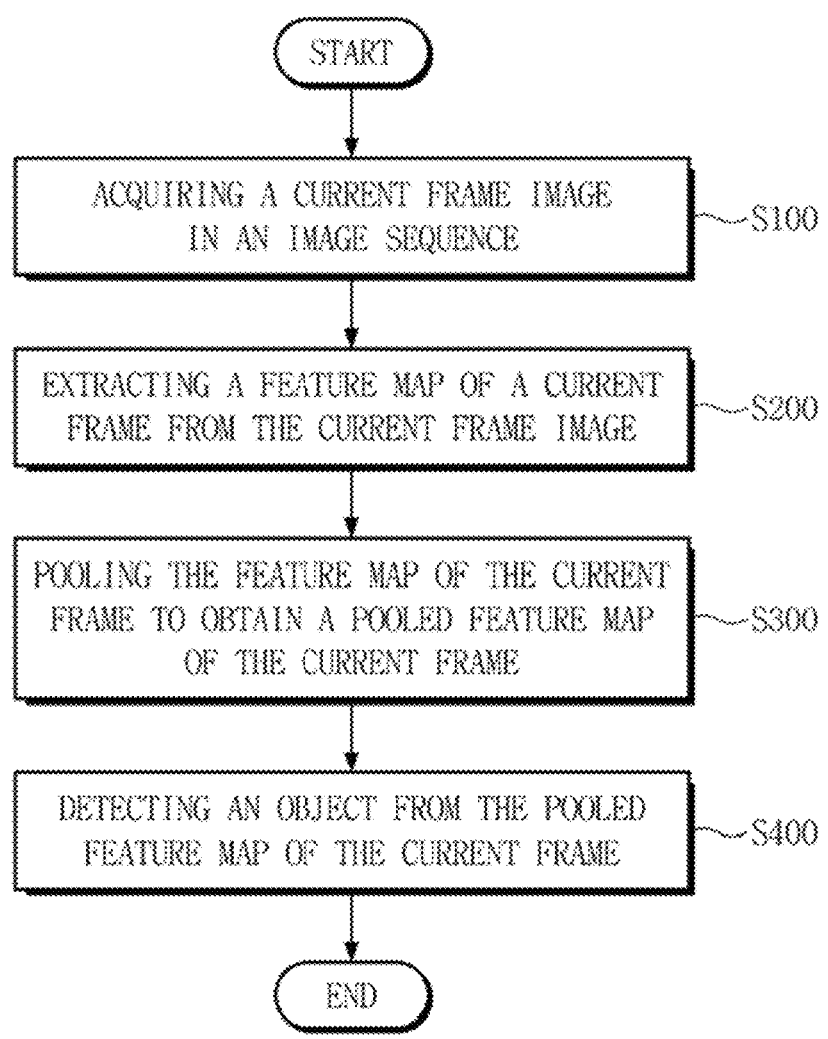
FIG. 1 illustrates a flow diagram of an object detection method in accordance with an exemplary embodiment of the present disclosure.

FIG. 1 illustrates a flow diagram of an object detection method in accordance with an exemplary embodiment of the present disclosure. The method may be performed by at least one processor executing instructions read from a memory, where the processor(s) may be part of an electronic apparatus such as a robot, a drone, an autonomous vehicle, a surveillance device, etc.

In operation S100 of the method, a current frame image in an image sequence of a plurality of frame images is acquired. As an example, the image sequence may be generated by capturing a real world scene using an "event camera", one example of which is a dynamic vision sensor (DVS) camera. An event camera may differ from a traditional camera by providing a varying amount of image data asynchronously or synchronously instead of periodically providing a complete frame's worth of pixel data in uniform intervals. For use in computer vision, an event camera may be advantageous over conventional cameras since object detection may be performed by processing a smaller amount of data.

Hereafter, a DVS camera will be discussed as an example of an event camera. A DVS camera may detect an event flow generated by a moving object by performing image capture of the object and generating an individual frame (also called an "event frame") using an event flow generated within a predetermined time period (for example, 20 milliseconds). Thus, the DVS camera may generate an image sequence of a plurality of frames according to a time sequence.

For instance, an event camera may output image data to an image processing device in packets that may each comprise a time stamp, particular coordinates of a pixel grid (e.g. a rectangular grid representing an image within a field of view), and image data just for those coordinates. For instance, if intensity of light at a coordinate "i" representing a pixel changes within the predetermined time period coinciding with a current frame by more than a threshold amount as compared to the previous frame, the image data for that coordinate may be included in the packet. Typically, such intensity changes occur at object edges when there is relative movement between the object and the camera. Thus, an event camera may mainly output just the image data for coordinates coinciding with object boundaries, and thereby outputs significantly less image data than a conventional camera to represent a given scene.

In operation S200, a feature map of a current frame is extracted from the current frame image. As an example, the feature map of the current frame may be obtained by performing a convolution operation on the current frame image repetitiously a predetermined number of times. For example, a convolution kernel may be obtained by learning and training in advance, and then the feature map of the current frame is obtained by performing a convolution operation on the current frame through the convolution kernel many times. A feature map of an object may be comprised mainly of boundary regions of an object, such as boundary regions in the form of lines, curves and corners.

It is noted here that in operation 200, if the current frame is an initial (first) frame in a frame sequence under consideration for object detection, although not shown in FIG. 1, the method may perform an initial object detection based on the extracted feature map of the initial frame. The method may then loop back to operation S100 where the second frame of the frame sequence is acquired (the second frame becomes the current frame) and a feature map for the second frame is extracted. The process flow then continues to operations S300 and S400. (Thus, it is understood that operations S300 and S400 are applicable to the second frame onward in the frame sequence.)

In operation S300 the feature map of the current frame is pooled with a prior feature map of a prior frame, to obtain a "pooled feature map" of the current frame. If the current frame is the second frame, the prior feature map may just be the feature map of the initial frame. If the current frame is the third or higher frame of the frame sequence, the prior feature map may be a pooled feature map. Further explanation on the pooling of feature maps is provided below.

Here, an object having a low movement speed can be more efficiently and/or accurately detected by obtaining the pooled feature map of the current frame including information of pooled feature maps corresponding to respective frame images prior to the current frame. This advantage stems from the fact that the obtained pooled feature map of the current frame includes more information about the moving object than a conventional feature map for a single frame.

Since the DVS camera generates one frame image (i.e., one event frame) through an event flow generated within a predetermined time period as mentioned above, when the movement speed of the object is low, the DVS camera may only detect a small amount of event flow within the predetermined time. As such, the information about the object included in the generated frame image is low, so that in conventional systems it is difficult to accurately detect the object from a single event frame obtained from the DVS camera. But since the DVS camera continuously detects the event flow in subsequent time periods, the event flow continuously detected over a number of predetermined time periods by the DVS camera includes more information about the object. The present inventive concept leverages this additional information to achieve more accurate object detection as will become apparent hereafter.

As background to facilitate an understanding of the feature map pooling of the present inventive concept, a general example of generating frame images by a dynamic vision sensor camera using an event flow will first be described in detail with reference to FIG. 2.

Figure 2:
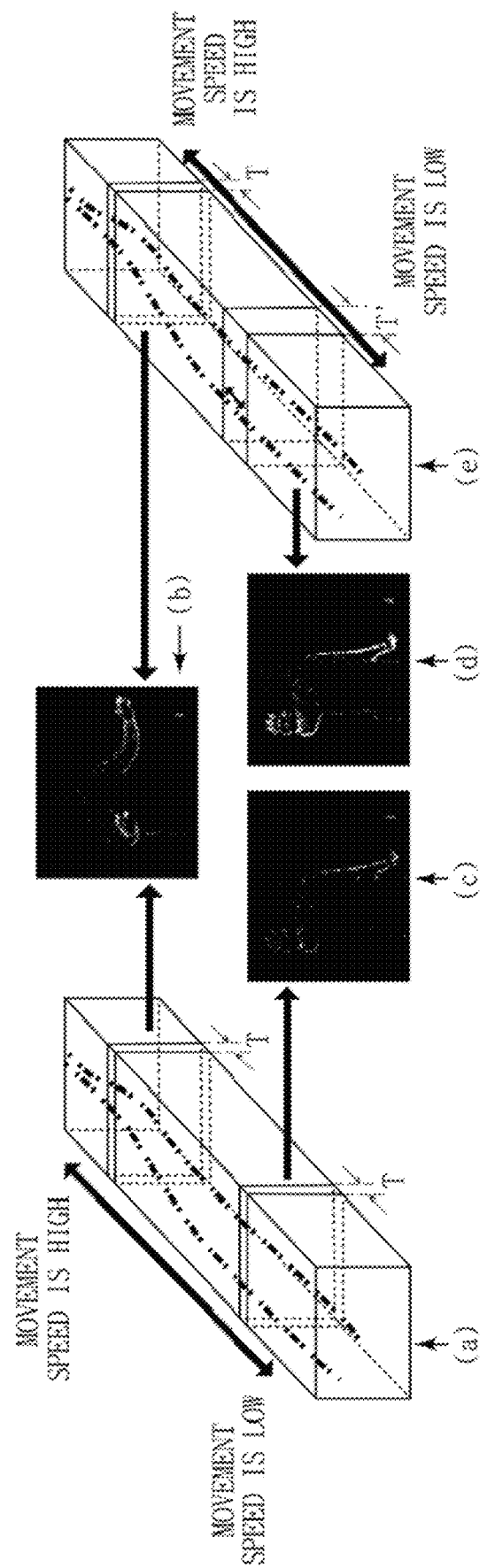
FIG. 2 illustrates a diagram of an example of enerating frame images by a dynamic vision sensor camera.

FIG. 2 illustrates a diagram of an example of generating frame images by a DVS camera. It is assumed that a DVS camera may capture video of an object moving within the rectangular boxed volumes labeled (a) and (e), where the curved lines represent object movement. Object movement speed is assumed to be low in the near end portions of the volumes (a) and (e) and high in the far end portions.

Frame (b) indicates one frame image generated by the DVS camera using an event flow obtained within a time period T in the case where the movement speed of the object is high. Frame (c) indicates one frame image generated by the DVS camera using an event flow obtained within a time period T in the case where the movement speed of the object is low. Frame (d) indicates a single frame image generated by the DVS camera using an event flow obtained within a time period T' longer than the time period T in the case where the movement speed of the object is low.

It may be seen by comparing frames (b) and (c) in FIG. 2 that the object in the image of frame (b) is more distinct than the object in the image of frame (c). Thus, a single frame image may be used to accurately detect the object when the object movement speed of the object is high. However, for low object moving speeds, object detection based on a feature map of a single frame may be inaccurate.

It may be seen by comparing frames (d) and (c) that when the event flow obtained within a longer time period T' for an event frame in the case where the object movement speed of the object is low, that the object in the generated image is more distinct. A more distinct image is generated because the event flow obtained within the longer time period may include more information about the object. However, designating a longer time period T' for an event frame may cause increased jitter and latency issues affecting imaging quality. Therefore, in the conventional art, a tradeoff exists between object detection accuracy and other variables that impact image quality.

In accordance with the inventive concept, however, the pooled feature map of the current frame is obtained by recursively using a plurality of pooled feature maps of previous frames. This allows the pooled feature map of the current frame to include information of respective pooled feature maps corresponding to respective frame images prior to the current frame. Consequently, the object may be accurately detected from the pooled feature map of the current frame in the case where the object has a low movement speed, without the need to lengthen the predetermined time intervals T for the event frames.

Returning to FIG. 1 as mentioned earlier, for any given frame sequence under consideration, operation S300 is applicable to the second and higher frames of the sequence because the initial frame may not use feature map information of any prior frames. Further, when the current frame image is the third or higher frame in the sequence, the pooled feature map of the current frame may be obtained by using a pooled feature map of a previous frame and the feature map of the current frame in operation S300. Here, the pooled feature map of the current frame may be obtained by recursively using feature maps of previous frames, thereby more efficiently using the event flow obtained prior to the current frame. Further explanation on recursive use of feature maps is explained later in connection with FIG. 4.

Figure 3:
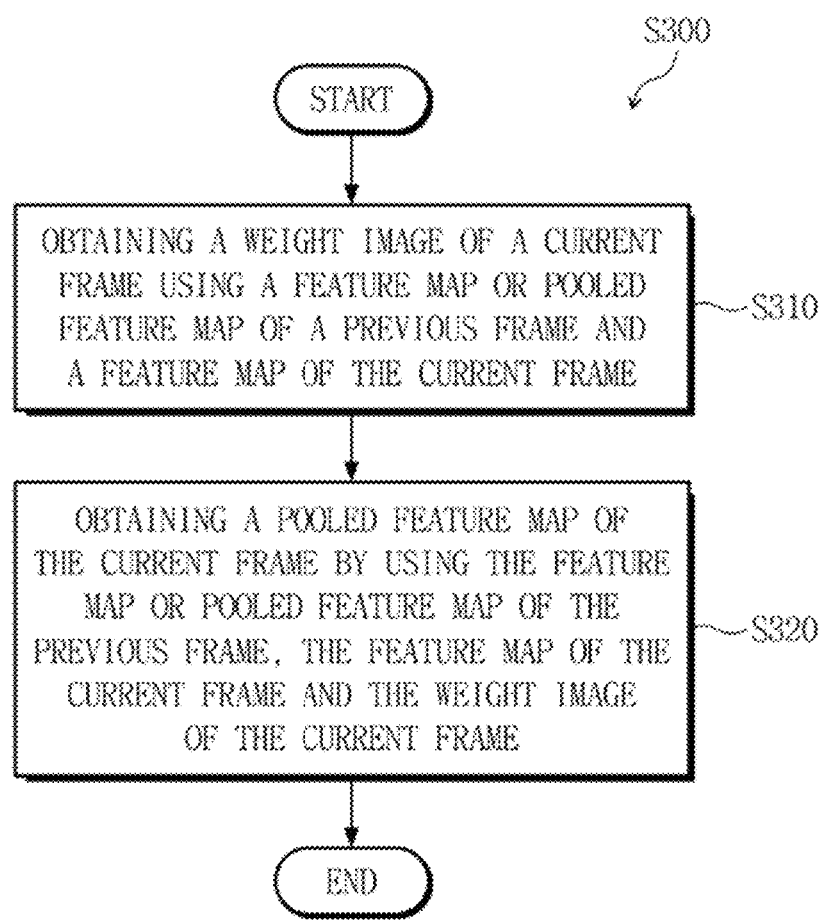
FIG. 3 illustrates a flow diagram of steps of obtaining a pooled feature map of a current frame in the object detection method in accordance with an exemplary embodiment of the present disclosure.

FIG. 3 illustrates a flow diagram of example sub-operations for operation S300 of FIG. 1, i.e., example operations for obtaining the pooled feature map of the current frame in the object detection method in accordance with an exemplary embodiment of the present disclosure.

As shown in FIG. 3, in operation S310, a weight image of the current frame is obtained using a feature map or a pooled feature map of the previous frame, and the independent feature map of the current frame. As discussed earlier, if the current frame is the second frame of the frame sequence, the pooled feature map of the current frame may be obtained using the independent feature map of the initial frame and the independent feature map of the current frame. If the current frame is the third or higher frame of the sequence, the pooled feature map of the current frame may be obtained from the pooled feature map of the previous frame and the independent feature map of the current frame.

Herein, the term "weight image of a current frame" refers to a degree of similarity between the current frame and the previous frame. A weight image may be understood as a distribution of individual weights of the coordinates of the image elements of the frame. When the similarity degree between an image element of the current frame and an image element located at the same coordinate in the previous frame is relatively high, the weight value for that coordinate in the current frame is considered closer to 1 (in a range of 0 to 1).

Likewise, the weight value in the current frame for that coordinate would be closer to 0 if the similarity degree is low.

As an example, when the current frame image is a $t^{th}$ frame image, with t being an integer larger than 1, respective weight values in the weight image of the current frame may be calculated through the following equation.

$$\omega_{t,i} = N_{mlp}(f_{t-1,i}, x_{t,i}).  \quad \text{[Equation 1]}$$

In Equation 1, $\omega_{t,i}$ is a weight value of a coordinate "i" in a weight image of a $t^{th}$ frame, and a value range of $\omega_{t,i}$ is [0, 1] (i.e, $\omega_{t,i}$ is within the range of 0 to 1), $N_{mlp}$ is a multilayer perceptron (MLP) neural network, and $f_{t-1,j}$ and $x_{t,i}$ are inputs to the multilayer perceptron neural network. The parameter $f_{t-1,i}$ is a pooled feature value of the coordinate i in a pooled feature map of a $(t-1)^{th}$ frame, and $x_{t,i}$ indicates a feature value of the coordinate i in a feature map of the $t^{th}$ frame, where i represents a common two-dimensional coordinate of an image element in the $t^{th}$ and $(t-1)$ frames.

As an example, the multilayer perceptron neural network $N_{mlp}$ may be implemented through a fully convolution network formed by a plurality of 1×1 convolution layers and end with a Sigmoid layer to output a weight value within the value range [0, 1]. It should be understood that the above network is only an example of the multilayer perceptron neural network $N^{mlp}$, and the multilayer perceptron neural network may be any multilayer perceptron neural network that can output a weight value according to the pooled feature value $f_{t-1,i}$ and the feature value $x_{t,i}$ as inputs.

Here, $\omega_{t,i}$ is a scalar, and $f_{t-1,i}$ and $x_{t,i}$ are vectors. As an example, $f_{t-1,i}$ and $x_{t,i}$ may be vectors in which respective channel values of a coordinate i are elements of the vectors, and value ranges of respective channel values are real number ranges. It should be understood that the channel values as the elements of $f_{t-1,i}$ are pooled feature values and the channel values as the elements of $x_{t,i}$ are feature values. For example, $f_{t-1,i}$ and $x_{t,i}$ may be vectors in which a red channel value, a green channel value and a blue channel value of coordinate i are elements of the vectors. The coordinate i may be a two-dimensional coordinate formed by an X axis value and a Y axis value.

It should be understood that the weight value $\omega_{t,i}$ of the $i^{th}$ coordinate in the weight image of the $t^{th}$ frame obtained through the above equation 1 is: a weight value corresponding to the feature value of coordinate i in the feature map of the $t^{th}$ frame.

In operation S320, the pooled feature map of the current frame is obtained by using the feature map or pooled feature map of the previous frame, the feature map of the current frame, and the weight image of the current frame.

Here, the pooled feature map of the current frame may be more accurately obtained by collectively considering the pooled feature map of the previous frame, the feature map of the current frame, and the weight image of the current frame.

As an example, respective pooled feature values in a pooled feature map of the $t^{th}$ frame may be calculated through the following equation.

$$f_{t,i} = \rho[s(f_{t-1,i}, \omega_{t,i}), x_{t,i}] \quad \text{[Equation 2]}$$

In Equation 2, $f_{t,i}$ indicates a pooled feature value of a coordinate "i" in the pooled feature map of the $t^{th}$ frame, a function s is used for multiplying $f_{t-1,i}$ and $\omega_{t,i}$, a function $\rho$ is a pooled function and is used for determining a maximum value among a range of values calculated through the function s and $x_{t,i}$ or is used for calculating an average value of the value calculated through the function s and $x_{t,i}$.

Here, when obtaining the pooled feature value $f_{t,i}$ of the current frame, the influence of the pooled feature value $f_{t-1,i}$ of the previous frame on the pooled result may be adjusted according to different coordinates i by applying the weight value $\omega_{t,i}$ to $f_{t-1,i}$.

Returning to FIG. 1, in operation S400, the object is detected from the pooled feature map of the current frame. Here, the object may be detected from the pooled feature map of the current frame through any one of various suitable methods that detects an object based on a feature map, except that the pooled feature map is substituted for a conventional feature map.

Figure 4:
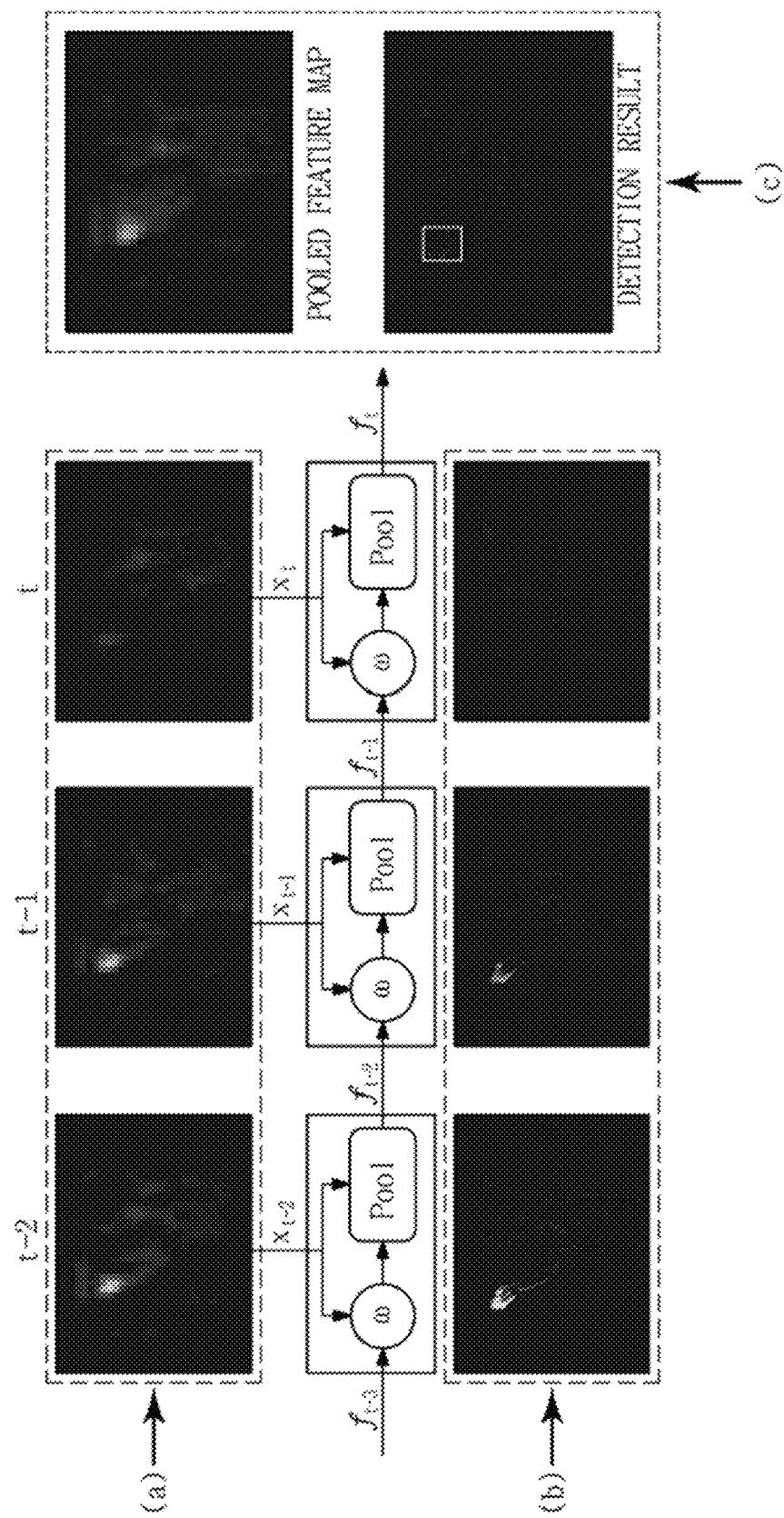
FIG. 4 illustrates a diagram of an object detection process in accordance with an exemplary embodiment of the present disclosure.

FIG. 4 illustrates a diagram of an object detection method in accordance with an exemplary embodiment of the present disclosure. Aspects of the method illustrated in FIG. 4 may be substantially the same as those described above in connection with FIGS. 1 and 3.

The legend (a) in FIG. 4 illustrates a feature map $x_{t-2}$ of a $(t-2)^{th}$ frame, a feature map $x_{t-1}$ of a $(t-1)^{th}$ frame, and a feature map $x_t$ of a $t^{th}$ frame. The legend (b) in FIG. 4 illustrates images of the $(t-2)^{th}$ frame, the $(t-1)^{th}$ frame and, the $t^{th}$ frame corresponding to the feature maps $x_{t-2}$, $x_{t-1}$ and $x_t$, at the corresponding positions. It should be understood that the value of t is an integer larger than 3 in the example of FIG. 4 (if t=4, (t-2) equals 2, such that the $(t-2)^{th}$ frame would not be the initial frame in the frame sequence).

Regarding the $(t-2)^{th}$ frame, first, a weight image ω of the $(t-2)^{th}$ frame may be obtained through a pooled feature map $f_{t-3}$ (not shown) of a previous frame (the $(t-3)^{th}$ frame) (not shown) and the feature map $x_{t-2}$ of the $(t-2)^{th}$ frame. Afterwards, the Pool operation is performed, that is, a pooled feature map $f_{t-2}$ of the $(t-2)^{th}$ frame is obtained through the obtained weight image ω of the $(t-2)^{th}$ frame, the pooled feature map of the frame prior to the $(t-2)^{th}$ frame, and the feature map $x_{t-2}$ of the $(t-2)^{th}$ frame. (Note that if the $(t-2)^{th}$ frame is just the second frame in the frame sequence, the "pooled" feature map $f_{t-3}$ would not actually be a pooled feature map but would instead be the independent feature map of the initial (first) frame.)

Regarding the $(t-1)^{th}$ frame, first, a weight image ω of the $(t-1)^{th}$ frame may be obtained through the pooled feature map ($f_{t-2}$) of a previous frame (i.e. the $(t-2)^{th}$ frame) and the feature map $x_{t-1}$ of the $(t-1)^{th}$ frame. Thereafter, the Pool operation is performed, that is, a pooled feature map $f_{t-1}$ of the $(t-1)^{th}$ frame is obtained through the obtained weight image ω of the $(t-1)^{th}$ frame, the pooled feature map $f_{t-2}$ of the $(t-2)^{th}$ frame, and the feature map $x_{t-1}$ of the $(t-1)^{th}$ frame.

Regarding the $t^{th}$ frame, first, a weight image ω of the $t^{th}$ frame may be obtained through the pooled feature map ($f_{t-1}$) of a previous frame (i.e. the $(t-1)^{th}$ frame) and the feature map $x_t$ of the $t^{th}$ frame. Afterwards, the Pool operation is performed, that is, a pooled feature map $f_t$ of the $t^{th}$ frame is obtained through the obtained weight image ω of the $t^{th}$ frame, the pooled feature map $f_{t-1}$ of the $(t-1)^{th}$ frame, and the feature map $x_t$ of the $t^{th}$ frame.

An upper portion of the area (c) in FIG. 4 illustrates an example of the finally obtained pooled feature map of the $t^{th}$ frame. It can be seen from the above analysis that since the pooled feature map of the current frame (the $t^{th}$ frame) is the pooled feature map obtained by recursively using the pooled feature maps of the previous frames, the pooled feature map of the current frame includes information of pooled feature maps corresponding to respective frame images prior to the current frame.

A lower portion of the area (c) in FIG. 4 illustrates an example detection result of the object detection from the pooled feature reap of the $t^{th}$ frame. The window within the frame image illustrated in the lower portion of (c) in FIG. 4 is a prediction window. The position of the prediction window is the position of the object that is detected. In the example of FIG. 4, the detected object is a person's hand in the captured scene.

According to the object detection method of the present disclosure, an object can be more accurately detected by combining information of the feature map of the current frame image and information of pooled feature maps of respective frames prior to the current frame image. In addition, the neural network system for object detection of the present disclosure can rapidly obtain an accurate detection result through less calculations, thereby improving the efficiency of object detection.

Figure 5:
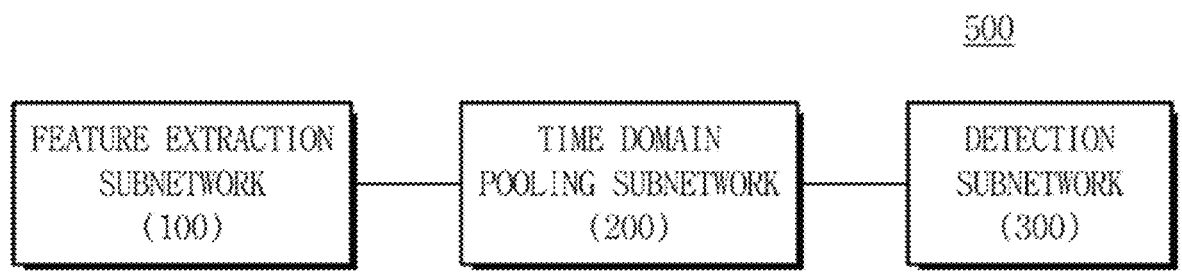
FIG. 5 illustrates a block diagram of a system for object detection in accordance with an exemplary embodiment of the present disclosure.

FIG. 5 illustrates a block diagram of a system, 500, for object detection in accordance with an exemplary embodiment of the present disclosure. As an example, system 500 may be a neural network system for object detection based on a fast regional convolution neural network (FRCNN) frame. System 500 may include a feature extraction subnetwork 100, a time domain pooling subnetwork 200, and a detection subnetwork 300.

Feature extraction subnetwork 100 may be configured to acquire a current frame image in an image sequence composed of a plurality of frame images and extract a feature map of a current frame from the current frame image. As an example, the image sequence may be generated by performing image capture with an event camera such as a dynamic vision sensor (DVS) camera. Here, as described earlier, the DVS camera may detect an event flow generated by a moving object by performing image capture of the object and generating an individual frame (also called an "event frame") using an event flow generated within a predetermined time period. Thus, the DVS camera may generate an image sequence of a plurality of frames according to a time sequence.

As an example, also mentioned earlier, the feature map of the current frame may be obtained by performing a convolution operation on the current frame image repetitiously a predetermined number of times. For example, a convolution kernel may be obtained by learning and training in advance, and then the feature map of the current frame is obtained by performing the convolution operation on the current frame through the convolution kernel many times.

A time domain pooling subnetwork 200 is configured to pool the feature map of the current frame to obtain a pooled feature map of the current frame, where the pooled feature map of the current frame includes information of pooled feature maps corresponding to respective frame images prior to the current frame.

Here, an object with low movement speed can be more efficiently detected by obtaining the pooled feature map of the current frame including information of pooled feature maps corresponding to respective frame images prior to the current frame (that is, the obtained pooled feature map of the current frame includes more information about the moving object).

An example of generating frame images by the DVS camera using an event flow and the reason why is difficult to detect a slow moving object conventionally using a single frame image obtained by the DVS camera have been described with reference to FIG. 2, and thus redundant description is omitted here.

As noted earlier, when the current frame image is the initial (first) frame image in the frame sequence, the time domain pooling subnetwork 200 may use the independent feature map of the initial frame as a feature map to be used in the second frame processing.

When the current frame image is the second or higher frame of the frame sequence, the time domain pooling subnetwork 200 may use a pooled feature map of a previous frame (or the independent feature map of the initial frame) and the feature map of the current frame to obtain the pooled feature map of the current frame. Here, the time domain pooling subnetwork 200 may recursively use the feature map of the previous frame to obtain the pooled feature map of the current frame. In this regard, the pooled feature map generating process with weighting and the implementations using equations 1 and 2 described above in connection with FIGS. 14, may be utilized by time domain pooling subnetwork 200.

Accordingly, the pooled feature map of the current frame may be more accurately obtained, and more accurate object detection achieved particularly for slow object movement, by collectively considering the pooled feature map of the previous frame, the feature map of the current frame, and the weight image of the current frame, in the same manner as described above for FIGS. 1-4.

The detection subnetwork 300 is configured to detect an object from the pooled feature map of the current frame. Here, the detection subnetwork 300 may detect the object from the pooled feature map of the current frame (generated in the manner discussed for FIG. 4) through any one of various suitable methods that detects an object based on a feature map, except that the pooled feature map is substituted for a conventional feature map.

Each of the feature extraction network 100, the time domain pooling subnetwork 200 and the detection subnetwork 300 may be embodied as at least one processor and memory. The at least one processor may be dedicated hardware circuitry, or at least one general purpose processor, comprised of hardware circuitry, that is converted to a special purpose processor by executing program instructions loaded from the memory.

Figure 6:
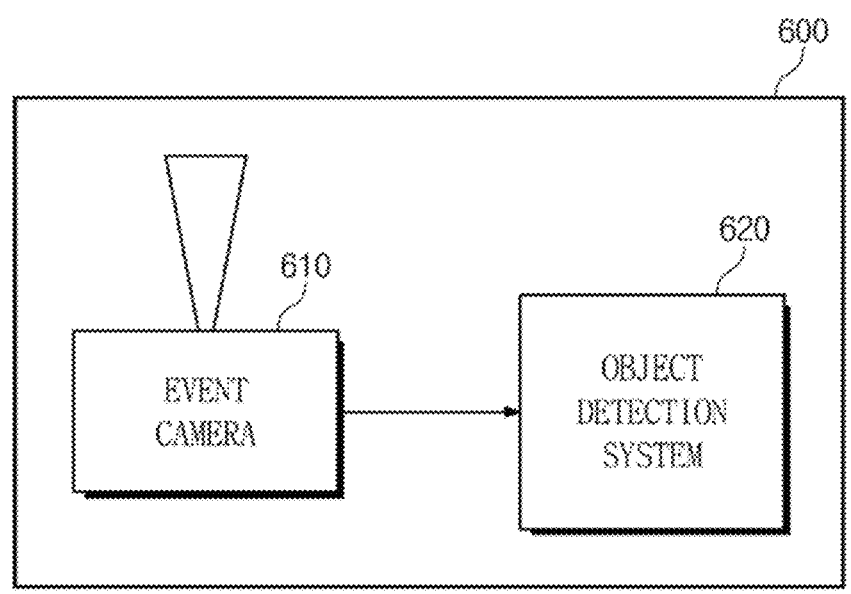
FIG. 6 is a block diagram of a camera-equipped electronic apparatus in accordance with an exemplary embodiment of the present disclosure.

FIG. 6 is a block diagram of a camera-equipped electronic apparatus, 600, in accordance with the inventive concept. Electronic apparatus 600 includes an event camera 610 such as a DVS camera, which provides event frames representing a captured scene over time to an object detection system 620. An example of object detection system 620 is the system 500 of FIG. 5. Object detection system 620 detects objects using the operations described hereinabove with respect to FIGS. 1-5. Electronic apparatus 600 may be, for example, a robot, a drone, an autonomous vehicle, a smart phone, a computer, or any other apparatus for which it is desired to incorporate object detection capability.

The above-described object detection method and system in FIGS. 1 and 3-6 may be termed a recursive and time-domain feature pooling (RATP) method and system of the present inventive concept. Table 1 below shows a comparison between experimental results of an example RATP system and current neural network systems for object detection (for example, a long and short term memory network (LSTM), a sequence non-maximum suppression network (Seq-NMS)).

TABLE 1

| Detection Method | Detection Accuracy (IOU = 0.3) | Average IOU |
| --- | --- | --- |
| Basic neural network | 73.69% | 0.634 |
| RATP | 79.37% | 0.663 |
| LSTM | 79.78% | 0.687 |

TABLE 1-continued

| Detection Method | Detection Accuracy (IOU = 0.3) | Average IOU |
|---|---|---|
| Seq-NMS | 80.06% | 0.810 |
| LSTM + RATP | 84.05% | 0.682 |
| Seq-NMS + RATP | 86.53% | 0.811 |

Referring to Table 1, the first column lists a detection method for detecting an object. Here, a basic neural network may indicate a Fast Regional Convolutional Neural Network (FRCNN) network without any additional structure; LSTM+RATP indicates a detection method of jointly using the LSTM and RATP; and Seq-NMS+RATP indicates a detection method of jointly using the Seq-NMS and the RATP. The second column indicates the detection accuracy in the case where a threshold of IOU (Intersection over Union) is 0.3. (The IOU criterion estimates object detection accuracy using axis-aligned or oriented boxes as ground truth.) The detection accuracy here may be the accuracy of a prediction frame for predicting an object, such as the prediction frame (c) in FIG. 4. The detection accuracy in the case where a threshold of IOU is 0.3 indicates the detection accuracy in the case where the detection result is determined to be correct (that is, the prediction frame is a correct prediction frame) if a value of IOU corresponding to the prediction frame is larger than or equal to 0.3. An average IOU indicates an average value of actual IOUs during the experiment process, that is, an average value of actual IOUs corresponding to the correct prediction frame. The average IOU here reflects the accuracy of the prediction position of the prediction frame for predicting an object as in FIG. 4.

It is seen from Table 1 that a neural network system (RATP) according to the exemplary embodiment of the present disclosure may have a detection accuracy higher than that of the basic neural network system and about the same (e.g. within one percent) as those of current LSTM and Seq-NMS. Moreover, when the neural network system is jointly used with the current LSTM or Seq-NMS, the detection accuracy is appreciably higher than the detection accuracy when the LSTM or the Seq-NMS is separately used. Thus, it may be seen that the RATP system of the inventive concept and the current LSTM and Seq-NMS have complementary characteristics for object detection. Hence, the use of RATP in conjunction with the current LSTM and Seq-NMS system makes up for shortcomings in detection aspects of LSTM and Sect-NMS individually. Considered individually, the RATP neural network system may have a prominent advantage in detecting objects with low movement speed.

As one example of combining the RATP system with either LSTM or Seq-NMS, event frames from an event camera may be provided to each of an RATP system processing component and a LSTM or Seq-NMS system processing component. Object movement speed may be determined by each system. If object speed is above a threshold, then the object detection results for the LSTM or Seq-NMS system may be used for a final detection result. If object movement speed is below the threshold, object detection results for the RATP system may be used.

According to the neural network system for object detection of the present disclosure, an object may be more accurately detected by combining information of the feature map of a current frame image and information of pooled feature maps of respective frames prior to the current frame image. In addition, the neural network system for object detection of the present disclosure may be an end-to-end neural network system, and thus can rapidly obtain an accurate detection result through a smaller number of calculations, thereby improving the efficiency of object detection.

In the above-described embodiments, an event camera such as a DVS camera is employed to provide the frames of image data to the object detection system. In alternative embodiments, a traditional type of camera (constant frame rate with complete frame data) is substituted for the event camera, albeit the traditional camera lacks the advantages of the event camera in terms of reduced processing, reduced memory requirements, and so forth.

In accordance with the exemplary embodiment of the present disclosure, a computer readable storage medium is further provided. The computer readable storage medium stores program instructions that, when executed by a processor, cause the processor to perform the above-described object detection method(s). The computer readable storage medium may be any suitable non-transitory data storage device that may store data which are read by a computer system. Examples of the computer readable storage medium include Read-Only Memory, Random-Access Memory, CD-ROMs, magnetic tapes, floppy disks, optical data storage devices, and carrier (such as data transmission through the Internet via a wired or wireless transmission path). The computer readable storage medium may also be distributed over a computer system connecting to the Internet, so that the computer readable codes are stored and executed in a distributed fashion. In addition, based on the flow charts and other diagrams and explanation hereinabove, functional programs, codes, and code segments to implement the object detection of the present disclosure may be easily generated by ordinary programmers in the field of the present disclosure.

It should be noted that the above embodiments of the present disclosure are only exemplary embodiments, but the present disclosure is not limited to these embodiments. Those skilled in the art should understand that these exemplary embodiments may be changed without deviating from the principle and idea of the present disclosure, wherein the scope of the present disclosure is defined in the claims and the equivalents thereof.

What is claimed is:

1. An object detection method, comprising:
  executing, by at least one processor, operations comprising:
  acquiring a current frame of a sequence of event frames representing an image sequence and obtained from an event camera;
  extracting a feature map of the current frame;
  pooling the feature map of the current frame with information of a pooled feature map of a previous frame to thereby obtain a pooled feature map of the current frame; and
  detecting an object from the pooled feature map of the current frame,.
  wherein,
  the at least one processor is part of a neural network system that determines object movement speed based on the event frames;
  the object detection method further comprising:
  providing the event frames to a long and short term memory (LSTM) network or a sequence non-maximum suppression (Seq-NMS) network; and
  using object detection results of the LSTM or Seq-NMS network as a final object detection result if the object movement speed is above a threshold, otherwise using the object detection of the at least one processor of the neural network system as the final object detection result.

2. The method of claim 1, further comprising:
acquiring an initial frame and a second frame of the frame sequence prior to acquiring the current frame;
extracting a feature map of the initial frame;
extracting a feature map of the second frame; and
pooling the feature map of the second frame with information of the feature map of the initial frame to thereby obtain a pooled feature map of the second frame.

3. The method of claim 1, wherein the pooling of the feature map of the current frame to obtain the pooled feature map of the current frame comprises:
obtaining a weight image of the current frame using the pooled feature map of the previous frame and the feature map of the current frame; and
obtaining the pooled feature map of the current frame using the pooled feature map of the previous frame, the feature map of the current frame, and the weight image of the current frame.

4. The method of claim 3, wherein when the current frame is a $t^{th}$ frame, where t is an integer larger than 1, respective weight values in the weight image of the current frame are calculated through the following equation:

$$\omega_{t,i}=N_{mlp}(f_{t-1,i},x_{t,i})$$

wherein $\omega_{t,i}$ indicates a weight value of a coordinate "i" in a weight image of a $t^{th}$ frame, and a value range of $\omega_{t,i}$ is [0, 1], $N_{mlp}$ is a multilayer perceptron neural network, and $f_{t-1,i}$ and $x_{t,i}$ are inputs to the multilayer perceptron neural network, wherein $f_{t-1,i}$ is a pooled feature value of the coordinate i in a pooled feature map of a $(t-1)^{th}$ frame, $x_{t,i}$ is a feature value of the coordinate i in a feature map of the $t^{th}$ frame, and i represents a two-dimensional coordinate of an image element.

5. The method of claim 4, wherein respective pooled feature values in a pooled feature map of the $t^{th}$ frame are calculated through the following equation:

$$f_{t,i}=\rho[s(f_{t-1,i},\omega_{t,i}),x_{t,i}]$$

where $f_{t,i}$ is a pooled feature value of the coordinate i in the pooled feature map of the $t^{th}$ frame, a function s is used for multiplying $f_{t-1,i}$ and $\omega_{t,1}$, a function $\rho$ is a pooled function and is used for determining a maximum value among a range of values calculated through the function s and $x_{t,i}$ or is used for calculating an average value of the value calculated through the function s and $x_{t,i}$.

6. The method of claim 1, wherein the pooled feature map of the current frame is obtained by recursive application of a plurality of pooled feature maps of respective previous frames.

7. The method of claim 1, wherein the sequence of frames is obtained through image capture by a dynamic vision sensor camera.

8. The method of claim 1, wherein extracting the feature map of the current frame comprises: obtaining the feature map of the current frame by performing a convolution operation on the current frame a predetermined number of times.

9. A system for object detection, comprising:
a first neural network system comprising:
a feature extraction subnetwork configured to acquire a current frame of a sequence of frames representing an image sequence and extract a feature map of the current frame;
a time domain pooling subnetwork configured to pool the feature map of the current frame with information of a pooled feature map of a previous frame to thereby obtain a pooled feature map of the current frame; and
a detection subnetwork configured to detect an object from the pooled feature map of the current frame;
a second neural network system configured to detect objects from the sequence of frames, the second neural network system comprising a long and short term memory (LSTM) network or a sequence non-maximum suppression (Seq-NMS) network;
wherein the first or second neural network system is configured to determine object movement speed, and if the object movement speed is above a threshold, object detection results for the second network system are used for a final object detection result, and if the object movement speed is below the threshold, object detection results for the first neural network system are used for the final object detection result.

10. The system of claim 9, wherein the feature extraction subnetwork is further configured to: acquire an initial frame and a second frame of the frame sequence prior to acquiring the current frame; extract a feature map of the initial frame; and
extract a feature map of the second frame; and
the time domain pooling subnetwork is further configured to pool the feature map of the second frame with information of the feature map of the initial frame to thereby obtain a pooled feature map of the second frame.

11. The system of claim 9, wherein the time domain pooling subnetwork is configured to obtain a weight image of the current frame using the pooled feature map of the previous frame and the feature map of the current frame, and obtain the pooled feature map of the current frame using the pooled feature map of the previous frame, the feature map of the current frame, and the weight image of the current frame.

12. The system of claim 11, wherein when the current frame image is a $t^{th}$ frame image, where t is an integer larger than 1, respective weight values in the weight image of the current frame are calculated through the following equation:

$$\omega_{t,i}=N_{mlp}(f_{t-1,i},x_{t,i})$$

wherein $\omega_{t,i}$ is a weight value of a coordinate "i" in a weight image of a $t^{th}$ frame, and a value range of $\omega_{t,i}$ is [0, 1], $N_{mlp}$ is a multilayer perceptron neural network, and $f_{t-1,i}$ and $x_{t,i}$ are inputs of the multilayer perceptron neural network, wherein $f_{t-1,i}$ is a pooled feature value of the coordinate i in a pooled feature map of a $(t-1)^{th}$ frame, $x_{t,i}$ is a feature value of the coordinate i in a feature map of the $t^{th}$ frame, where i represents a two-dimensional coordinate of an image element.

13. The system of claim 12, wherein the time domain pooling subnetwork is configured to calculate respective pooled feature values in a pooled feature map of the $t^{th}$ frame through the following equation:

$$f_{t,i}=\rho[s(f_{t-1,i},\omega_{t,i}),x_{t,i}]$$

wherein $f_{t,i}$ indicates a pooled feature value of the coordinate i in the pooled feature map of the $t^{th}$ frame, a function s is used for multiplying $f_{t-1,i}$ and $\omega_{t,i}$, a function $\rho$ is a pooled function and is used for determining a maximum value among a range of values calculated through the function s and $x_{t,i}$ or is used for calculating an average value of the value calculated through the function s and $x_{t,i}$.

14. The system of claim 9, wherein the sequence of frames is acquired from a dynamic vision sensor camera.

15. The system of claim 9, wherein the feature extraction subnetwork is configured to obtain the feature map of the current frame by performing a convolution operation on the current frame repetitiously a predetermined number of times.

16. A non-transitory computer readable storage medium storing program instructions that, when executed by a processor, cause the processor to perform the method of claim 1.

17. An electronic apparatus comprising:
an event camera; and
an object detection system including at least one processor executing instructions to:
acquire from the event camera a current frame among event frames generated by the event camera;
extract a feature map of the current frame;
pool the feature map of the current frame with information of a pooled feature map of a previous frame to thereby obtain a pooled feature map of the current frame, wherein the pooled feature map of the previous frame is generated through recursive application of a plurality of pooled feature maps of respective prior frames; and
detect an object from the pooled feature map of the current frame,
wherein:
the object detection system is a neural network system, and the electronic apparatus further comprising at least one of a long and short term memory (LSTM) network and a sequence non-maximum suppression (Seq-NMS) network; and
the at least one of the LSTM and Seq-NMS network is configured to receive the event frames from the event camera and determine therefrom object movement speed;
wherein if the object movement speed is above a threshold, object detection results for the LSTM or Seq-NMS network are used for a final object detection result, and if object movement speed is below the threshold, object detection results for the neural network system are used for the final object detection result.

* * * * *